United States Patent
Jainek et al.

(10) Patent No.: US 6,177,003 B1
(45) Date of Patent: Jan. 23, 2001

(54) FILTER WITH SAFETY ELEMENT FOR FILTERING ENGINE OIL

(75) Inventors: Herbert Jainek, Heilbronn; Roland Wiederhold, Steinheim, both of (DE)

(73) Assignee: Filterwerk Mann & Hummel GmbH, Ludwigsburg (DE)

( * ) Notice: Under 35 U.S.C. 154(b), the term of this patent shall be extended for 0 days.

(21) Appl. No.: 09/297,127

(22) PCT Filed: Aug. 9, 1997

(86) PCT No.: PCT/EP97/04351

§ 371 Date: Jun. 15, 1999

§ 102(e) Date: Jun. 15, 1999

(87) PCT Pub. No.: WO98/18539

PCT Pub. Date: May 7, 1998

(30) Foreign Application Priority Data

Oct. 26, 1996 (DE) .............................. 196 44 646

(51) Int. Cl.[7] .................. B01D 35/14; B01D 35/143; B01D 35/147

(52) U.S. Cl. .............. 210/85; 210/91; 210/130; 210/133; 210/232; 210/444

(58) Field of Search .................. 210/91, 85, 130, 210/133, 232, 234, 235, 348, 416.4, 440, 443, 444

(56) References Cited

U.S. PATENT DOCUMENTS 3,405,804 * 10/1968 Rosaen .
3,507,391 * 4/1970 Rosaen .
3,591,003 * 7/1971 Cooper .

FOREIGN PATENT DOCUMENTS

4215232 * 11/1993 (DE) .
9411212 * 10/1994 (DE) .
WO9217262 * 10/1992 (WO) .

* cited by examiner

*Primary Examiner*—Matthew O. Savage
*Assistant Examiner*—Terry K. Cecil
(74) *Attorney, Agent, or Firm*—Evenson, McKeown, Edwards & Lenahan, P.L.L.C.

(57) ABSTRACT

A filter for filtering the lubricating oil in an internal combustion engine. The filter comprises a housing (10) having an unfiltered oil inlet and a filtered oil outlet. A filter element (16) is disposed in the housing (10). A cover (13) is provided with a safety element (20) which effectively prevents the housing (10) from being closed by the cover (13) if the filter element (16) is missing. The safety element is a tipping member affixed to the housing or the cover and which tips under the force of gravity into a blocking position when the filter element is missing.

3 Claims, 3 Drawing Sheets

FILTER WITH SAFETY ELEMENT FOR FILTERING ENGINE OIL

BACKGROUND OF THE INVENTION

The invention relates to a filter, in particular for filtering the lubricating oil in an internal combustion engine.

An oil filter for the cleaning of lubricating oil in the internal combustion engines of motor vehicles is known from the European patent document 03 14 915. This is comprised of a filter housing that is at least approximately upright with a cover which can be screwed onto it; further it includes an annular oil filter cartridge inserted in the filter housing, to which the contaminated oil is conveyed. On the bottomfloor of the oil filter housing, there is a bottom discharge valve which opens up a dischargechannel when the cover is opened and the oil filter cartridge is removed. The valve comprises two springs and a valve plate and is constructed in such a way that even with the oil filter cartridge missing, it closes anyway because of the increasing oil pressure, so that a supply of oil to the motor is also assured when no filter cartridge is inserted.

One disadvantage is, however, that when the filter insert is missing, the unfiltered oil reaches the areas to be lubricated and results in damage to the bearings. The motor can be used without an oil filter cartridge for a short time in emergency operation, however it will not be apparent that no oil filter cartridge is present.

SUMMARY OF THE INVENTION

Therefore, the object of the invention is to provide a filter, in particular for filtering the lubricating oil in an internal combustion engine, which indicates that a filter insert is missing or prevents operation of the motor when the filter insert is missing.

This object is achieved by a filter as described hereinafter.

One advantage of the invention lies in the fact that due to a safety element, when the filter element is missing, it becomes impossible to close the housing with the cover.

In accordance with an alternative embodiment of the invention, a particularly simple and reliable valve construction is shown. The valve serves as a bypass valve between the unfiltered oil side and the filtered oil side and is made of few components, that is, only a valve body, a spring and a valve plate. Such valves are preferably produced of thermoplastic synthetic resin material. However, the spring is, of course, a metal spring. The valve plate is a synthetic resin ring which is pulled over the pressure spring and the valve body and is welded, for example, by an ultrasonic sealing process to a supporting body which is likewise made of thermoplastic synthetic resin material. This has the advantage that, in addition to the low number of components, a low leakage is achieved due to the extreme roundness of the conical nipple compared to other valve construction principles. Of course, it is also possible to interlock, snap or glue the valve plate to the supporting body.

According to one embodiment of the invention, the safety element can be a tipping element or a rocker, which prevents the cover from being screwed onto the housing by means of a blocking effect. When the filter insert is missing, the tipping element blocks the cover from being put on due to the force of gravity or a spring.

In a further embodiment of the invention it is envisioned that a pressure relief valve or a bypass valve is provided between the unfiltered oil side and the filtered oil side, wherein it is also possible to monitor the functioning of the valve with a tappet which indicates when the valve is open.

The filter element is recyclable and is made of a filter material folded in zig-zag fashion, which is provided on each end face with a casting material. This castable material is, for example, nitrile rubber and produces a separation of the unfiltered liquid area from the filtered liquid area in the manner of a radial seal.

These and other characteristics of preferred refinements of the invention are based not only on the claims, but also on the specification and the drawings, where each of the individual characteristics can be realized either alone or together as sub-combinations in the embodiment of the invention and in other fields and can represent embodiments that are advantageous as well as being patentable themselves, for which protection is claimed here.

BRIEF DESCRIPTION OF THE DRAWINGS

The invention is described in further detail hereinafter with reference to a working example.

DETAILED DESCRIPTION OF PREFERRED EMBODIMENTS

Figure 1:
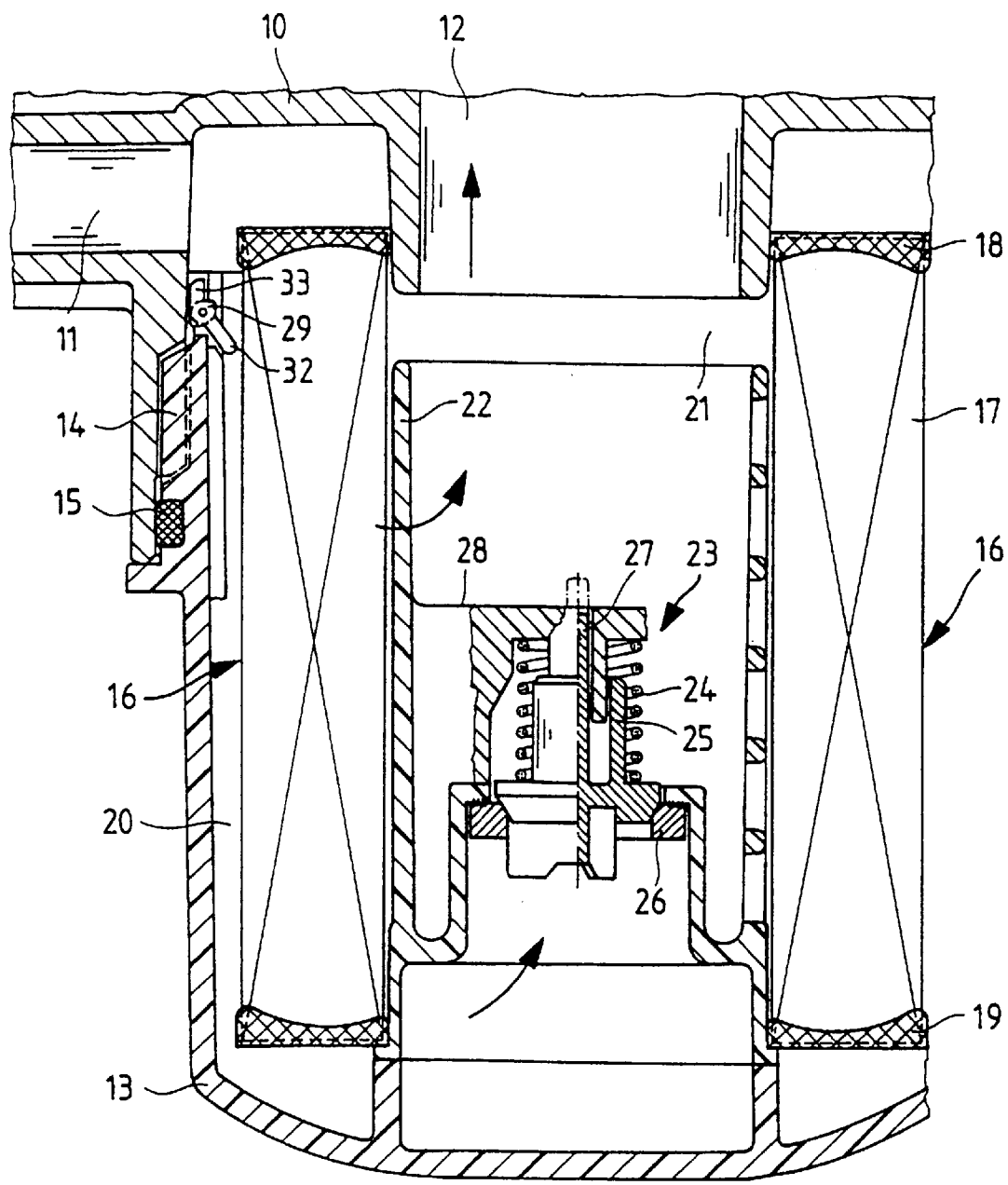
FIG. 1 shows the cross-sectional view of a filter for filtering lubricating oil.

A filter according to FIG. 1 comprises a housing 10 with a liquid inlet for unfiltered oil 11 and a liquid outlet for filtered oil 12. The housing is closed with a cover 13. The securing of the cover and the sealing are achieved by means of a threaded connection 14 and a sealing element 15. In the housing there is a filter element 16. This is comprised of a pleated paper or fleece element 17, which is provided with synthetic resin end discs 18, 19 on its face-forming ends. The end discs simultaneously serve as a radial seal between the unfiltered liquid region 20 and the filtered liquid region 21.

A supporting body 22 is located in the filtered liquid region. This is provided with a pressure release valve 23. The pressure release valve is comprised of a pressure spring 24, a valve body 25, and a valve plate 26 which is welded to the supporting body 22. To assemble the valve, the pressure spring 24 is simply placed in the supporting body, then the valve body 25, and the valve plate 26 pulled over, and the valve plate 26 secured to the supporting body 22, for example by an ultrasonic welding process. The valve body is provided with an indicator pin 27. Normally this is not visible in the closed position. If the valve is in the open position because of tilting, this pin extends outwardly beyond the plane 28 of the supporting body 22 in accordance with the course shown in broken lines, and thereby indicates that it not ready for operation.

Figure 2:
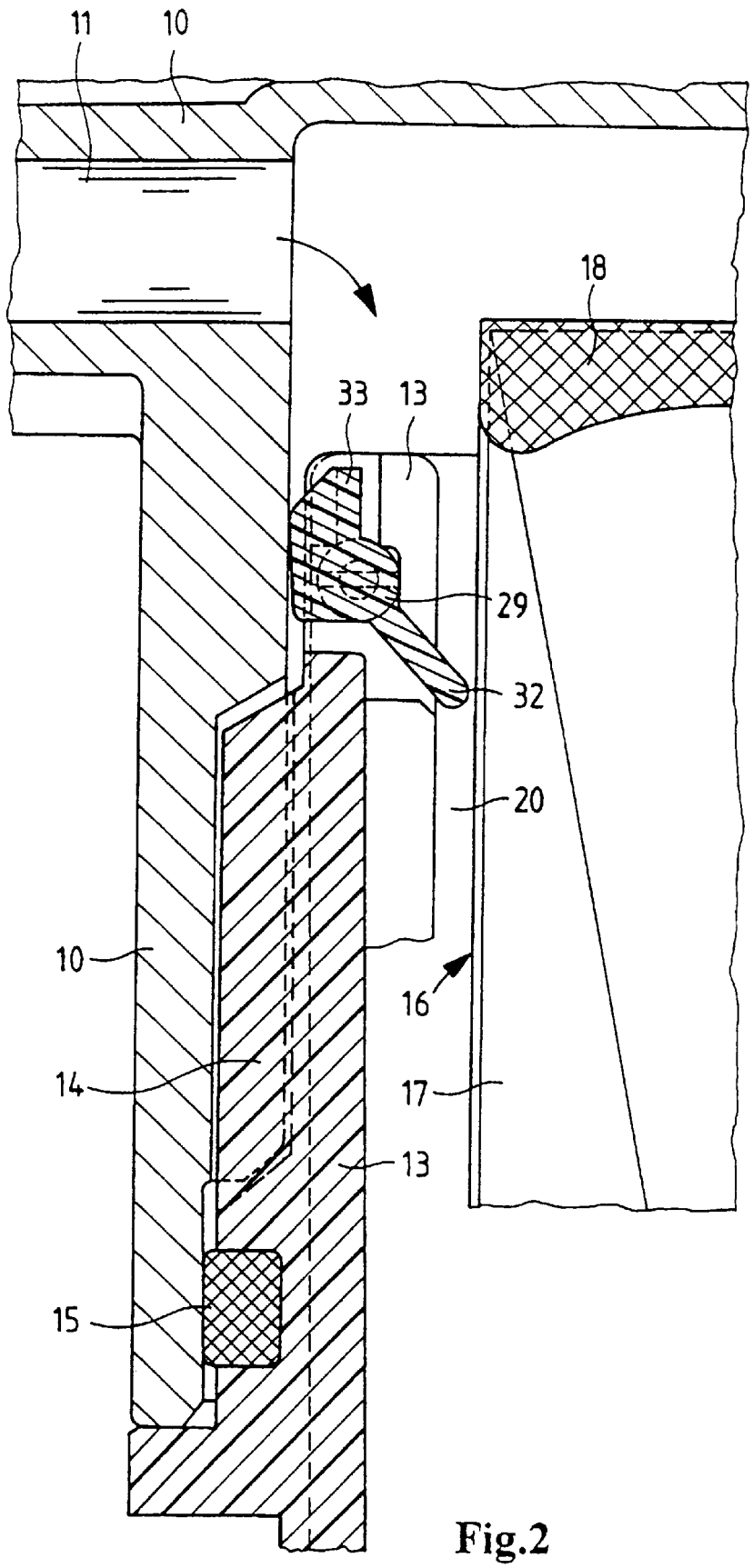
FIG. 2 shows a detail view.
Figure 3:
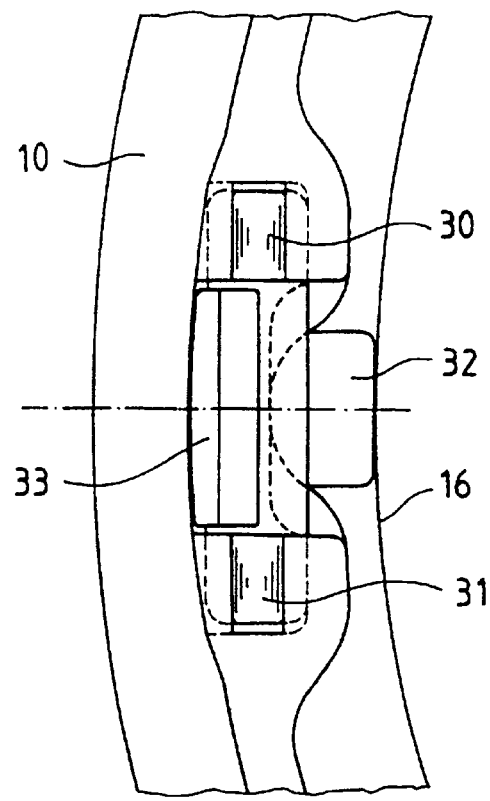
FIG. 3 shows a top plan view looking down on a safety element.

In order to prevent the closing of the cover 13 when the filter element 16 is missing, a safety element 29 is provided. This is shown in a detail view in FIG. 2. The safety element is located on the cover 13 of the filter and is, as can be seen in the top view according to FIG. 3, provided with axle pieces 30, 31 and rotatably mounted. When the filter element 16 is inserted, the lever arm 32 lies against the filter element 16 and thereby positions the blocking member 33 of the safety element 29 in a position which makes it possible to put the cover 13 on the housing 10.

Figure 4:
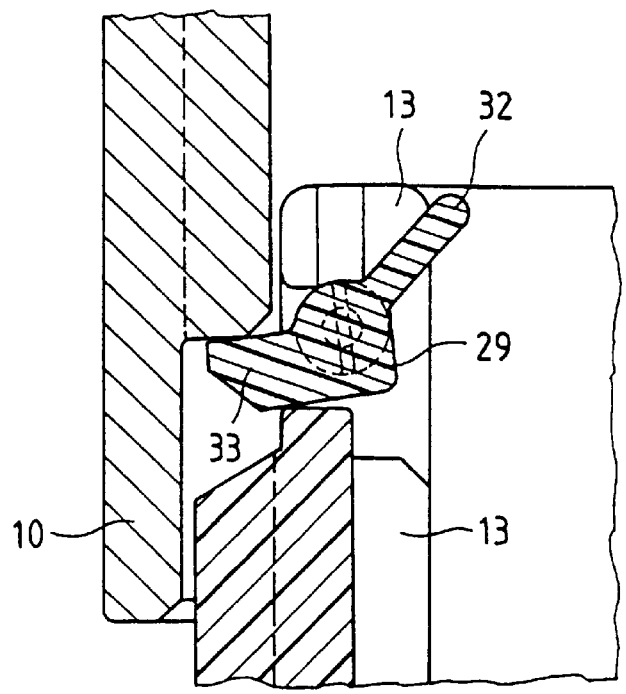
FIG. 4 shows a detail view of the safety element in the blocking position

In FIG. 4, the position of the safety element 29 which it takes when the filter element is missing is shown. Due to the force of gravity and the heavier mass of blocking member 33, the safety element tips into the position shown. The blocking member 33 thereby effectively prevents the cover 13 from being set on the housing 10. Only the insertion of a filter element returns the safety element 29 to the proper position in accordance with FIG. 2.

What is claimed is:

1. A filter for filtering lubricating oil in an internal combustion engine, said filter comprising a housing having an inlet for unfiltered oil and an outlet for filtered oil, a filter element arranged in said housing, a cover for closing said housing and surrounding said filter element, and a safety element which prevents the cover from closing the housing if the filter element is missing, said safety element comprising a tipping member affixed to the housing or cover which tips under the force of gravity into a blocking position when the filter element is missing and prevents the cover from being put on the housing.

2. A filter according to claim 1, further comprising a pressure release valve which opens to bypass the filter element if a differential pressure limit is exceeded, said pressure relief valve having a tappet which indicates when the valve is in an open position.

3. A filter according to claim 1, wherein said filter element is comprised of a filter material folded in zig-zag fashion and is provided on each end face with a cast synthetic resin end disk which forms a radial seal which seals off an unfiltered liquid space from a filtered liquid space.

* * * * *